Sept. 9, 1952 N. C. PRICE 2,610,005
PROPULSIVE MEANS FOR VERTICAL RISING AIRCRAFT
Filed Dec. 3, 1949
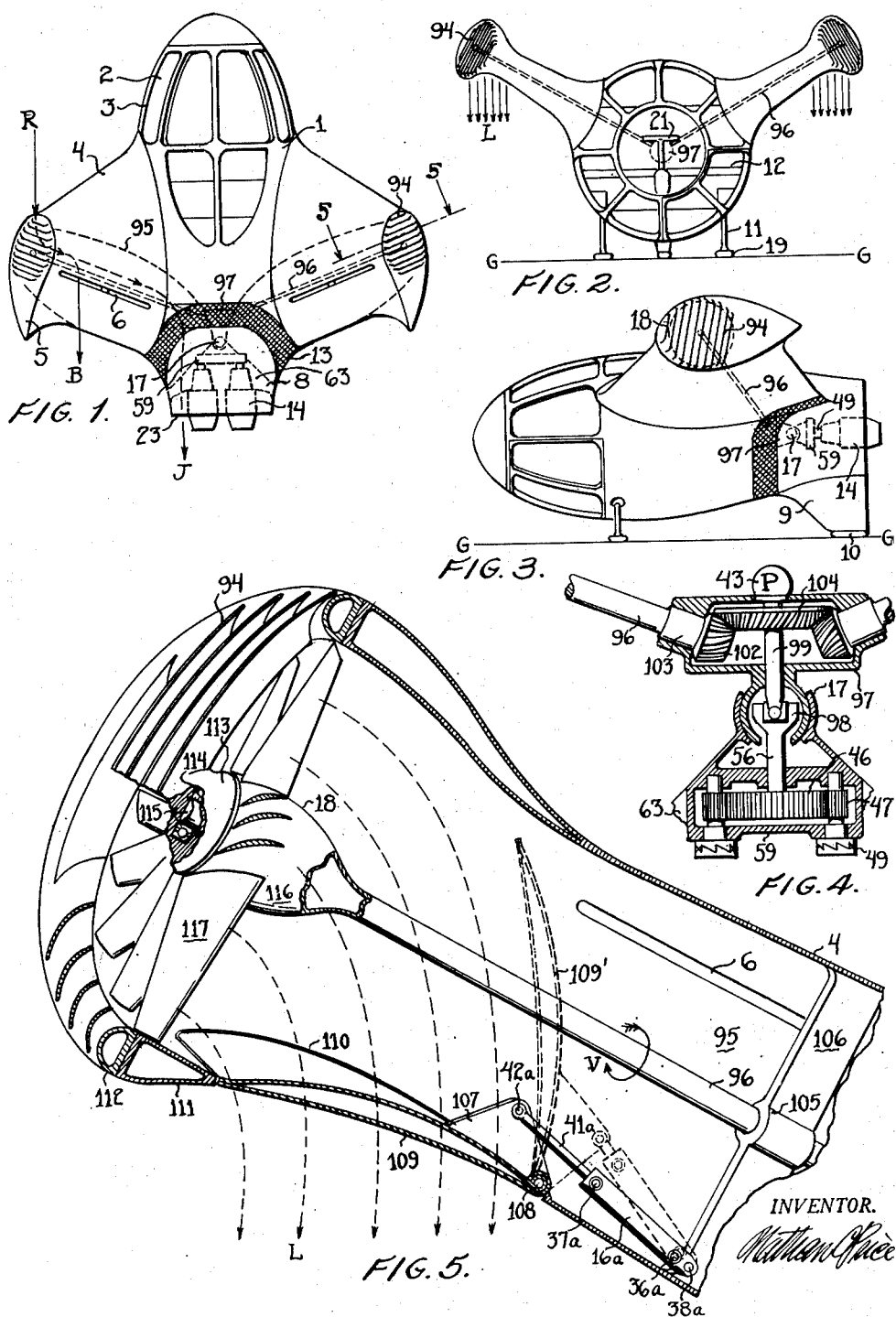

Patented Sept. 9, 1952

2,610,005

UNITED STATES PATENT OFFICE 2,610,005

PROPULSIVE MEANS FOR VERTICAL RISING AIRCRAFT

Nathan C. Price, St. Helena, Calif., assignor to Lockheed Aircraft Corporation, Burbank, Calif.

Application December 3, 1949, Serial No. 131,028

17 Claims. (Cl. 244—12)

The present invention contemplates propulsive means for vertical rising aircraft whereby either vertical or horizontal flight may be imparted to an aircraft, subject to control, while maintaining the cabin of the aircraft in a horizontal position. In my copending application Serial No. 120,918, filed October 12, 1949, I have shown a closely related propulsive means for vertical rising aircraft, wherein the attitude of the cabin is caused to change while the seats for passengers remain upright, which is permissible for instances in which the maximum high speed performance and greatest range are to be obtained.

The servo control aspects and the details of airplane construction preferably to be used with the present invention are similar to those described in greater detail in my copending application Serial No. 120,918, and therefore the same numerical designations are utilized, where applicable, in both cases.

The present invention is partially characterized by use of at least one ducted compressor, for propulsive reaction, the axis of which is placed at a predetermined angle to horizontal and vertical flight directions of the aircraft, whereby rammed air may be furnished to the compressor's inlet, and discharged therefrom in both vertical and horizontal directions in any proportion, subject to control, with a minimum loss of propulsive effort due to friction of turning vanes and ducts associate with the compressor.

In connection with the present invention the aforestated ducted compressor, or if desired any equivalent reaction propulsion device such as a turbo-jet engine to be used as a means for forcing through-flow of propulsive medium, may be placed in the fuselage, wing fillets, or wings of the aircraft, although it is generally preferable from the standpoints of stability and control simplicity to locate the compressor or equivalent through-flow device at the ends of strongly upswept wings as shown in the accompanying illustrations.

The invention has a number of objectives, some of which are as follows:

First, to provide an effective means of enabling an aircraft to fly either vertically or horizontally without tilting the cabin through a large angle.

Second, to furnish a fully enclosed or protected propulsive means, to produce vertical or horizontal motion of an aircraft, without entailing excessive frictional losses of the propulsive medium.

Third, to insure adequate directional control and stability.

Fourth, to provide propulsive apparatus which is reliable, and simple from a mechanical standpoint.

Fifth, to furnish a safe propulsive means for vertical rising aircraft, of such type that if mechanical failure should occur, the aircraft could glide to a safe landing, subject to control.

Sixth, to provide a vertical rising aircraft of low external and internal drag.

Seventh, to provide a vertical rising aircraft which minimizes noise and vibration affecting passengers.

These and other objectives and features of novelty will become evident hereinafter in the description, which together with the following drawings illustrate preferred embodiments of the invention.

Figure 1 illustrates a typical utilization of the propulsive system in an aircraft, viewed from above.

Figure 2 illustrates the aircraft of Figure 1 parked on the ground, viewed from the front.

Figure 3 illustrates the aircraft of Figure 2 viewed from the side.

Figure 4 shows a partially cutaway section of the gear drive mechanism utilized to transmit power from the gas turbine engines to the ducted compressors of the propulsive system.

Figure 5 is a fragmentary section of one of the ducted compressors, and of the controllable flow passage associated with the compressor, in the outer portion of the wing.

Referring now to the drawings in which like reference numerals refer to corresponding parts throughout the several figures, the apparatus of the invention is as follows:

The general arrangement of the apparatus is best shown in Figures 1, 2, and 3, in which an ellipsoidal cabin 1 is articulated at the rear end to an empennage 8, or tail assembly, by a universal joint 17 lying along or adjacent to the major axis of the cabin. Directional control of the aircraft may be partially achieved by regulation of the angle of the empennage 8 with respect to the cabin, subject to manually adjustable gyro servo controls of the hydraulic type as described in copending application Serial No. 120,918.

Backswept wings 4 possessing a strong dihedral angle extend from the sides of the cabin. The cabin structure is mainly composed of a plurality of plastic windows 2 secured in a relatively narrow framework 3 except for the solid portions of formed sheet Duralumin where the wings 4 and the empennage 8 are confronted, and contains a seat 12 for passengers approximately opposite the formost junction of the wings to the cabin. A manual control column 21 is located at the middle of the seat 12 for directional guidance of flight.

The empennage 8 has the shape of a truncated cone, the smaller diameter of which is to the rear, and from the lower side of which projects a vertical stabilizer 9. The outer free end of the stabilizer 9 and a pair of struts 11 extending downward from the lower side of the cabin terminate in resilient pads 19 for contact with the ground G—G. The struts 11 may contain pneumatic-hydraulic cushioning devices, and retracting mechanism customary to aircraft practice, though such are not shown in the accompanying drawings.

The wings 4 terminate at their free ends in tip shields 5 of bulbous shape, making it possible to house ducted compressors 18, inducting air in the direction indicated by the arrow R through a plurality of turning vanes 94. A portion of this air is delivered along wing ducts 95 to ejection boundary layer slots 6 in the upper surface of the wings 4, issuing in the rearward direction indicated by the arrow B to increase wing lift and to produce jet reaction propelling the aircraft. Another portion of the delivered air is led from the ducts 95 into the interior of the empennage 8 from which it is expelled at a nozzle 23 to form a propulsive jet indicated by the arrow J directionally controllable in accordance with the controllable angular position of the empennage 8 with respect to the cabin 1 about the universal joint 17 as a pivot. The empennage 8 is also flexibly connected to the adjoining outer surfaces of the aircraft by a fillet 13 composed of rubberized fabric, sliding sheets, or the like to permit directional control movement of the empennage, while preventing loss of entrained air.

Engines 14, preferably of the gas turbine type, are supported within the empennage 8 by webs 63, and behind the universal joint 17, being adjustable in angle together with the empennage. Referring to Figure 4, the power of the engines is transmitted through overrunning clutches 49 to a gearbox 59 containing spur pinions 47 in driving relation to a spur gear 46. The torque of gear 46 is delivered along a shaft 56, through a universal joint 98 which is concentric with the universal joint 17, and along a shaft 99 to a spiral bevel gear 104 enclosed in a gearbox 97 mounted on the rear portion of the cabin 1. An hydraulic pump 43 for directional servo-controls such as described in copending application Serial No. 120,918, receives power from the shaft 99. Spiral bevel pinions 102 in driven relationship with the gear 104 are journalled by bearings 103 of the gearbox 97.

Shafts 96 extend from the pinions 102 within the wings at a forward and upward angle, preferably in excess of 30 degrees, to the ducted compressors 18 within the tip shields 5.

Referring to Figure 5 the shaft 96 being relatively long is stabilized at an intermediate portion of its length by a pillow block 105 secured by a web 106 to the wing 4. The outboard end of the shaft 96, revolving in the direction indicated by the arrow V, terminates in a compressor hub 116 upon which are secured airfoil vanes 117, to induce flow of air. A rim 111 composing a portion of the tip shield 5, shrouds the tips of the vanes 117. An annular, bell-mouthed cover 112, secured to the outboard side of the rim 111, supports the turning vanes 94, which are preferably of the cambered airfoil type. A journal 115 at the outboard end of the compressor hub 116 is mounted by a ball bearing 114 in a stationary hub 113 supported by the turning vanes 94. The turning vanes 94 act as compressor guide vanes to cooperate with the airfoil vanes 117.

Inboard from and beneath the compressor 18 is situated an air outlet 110 in the lower surface of the wing duct 95, leading to the atmosphere. The degree of opening of the outlet 110 is determined by the angular position of a door 109 secured to the wing 4 by a hinge 108 on the inboard side of the outlet 110. The angle of the door 109, controlling the proportionate flow of compressor air to the outlet 110 and to the wing duct 95 is determined by the relative extension or retraction of an hydraulic cylinder 16a, or jack, acting upon a bracket 107 extending from the upper side of the door, through a pin joint 42a and piston rod 41a. The opposite end of the cylinder 16a is secured by a pin joint 38a to the web 106.

In the extreme position shown by dotted lines 109' the door has substantially opened the outlet 110, and simultaneously closed the wing duct 95 to compressor air flow, and in this position a downward air flow indicated by the arrows L causes the aircraft to be lifted by reaction, the lifting force being applied well above the center of mass of the aircraft due to the dihedral of the wings, thereby insuring stability.

Hydraulic pressure connections 37a and 36a lead to the interior of the cylinder 16a, and these connections may communicate with servo control tubes 37' and 36' described in copending application Serial No. 120,918 to achieve adjustable automatic regulation of flight direction.

It will be noted that in the above described apparatus for producing vertical or horizontal jet reaction by means of through-flow air the rotational plane of the axial flow compressor blading is inclined at an acute angle to both horizontal and vertical flight directions to materially reduce air turning losses and duct length. It has been determined by tests that the air turning losses decrease far more abruptly than the proportionate reduction in turning angle, as the turning angle is reduced below 90 degrees to 55 degrees, for example.

The location of the compressor air inlet at the tip shields 5 improves directional stability in horizontal or vertical flight, and wing tip vortex losses are suppressed. The rotating blading is effectively shielded from contact with foreign objects, such as tree branches. The location of the ducted compressor, remote from the cabin, reduces noise and vibration. In the event of compressor rotor failure, the primary structure of the aircraft will remain undamaged, since it is out of the planes of compressor rotation, and the aircraft can be caused to glide to a safe landing.

The two-place aircraft shown in the accompanying drawings possesses a wing span of 12 feet and a gross weight of 1600 lbs. The cruising speed is estimated to be 300 miles per hour at 5000 feet altitude, and the range to be 450 miles. During vertical rising the ducted compressors, measuring 30 inches in diameter revolve at a maximum speed of 6500 revolutions per minute, and each compressor then discharges a weight flow of approximately 130 pounds of air per second. A wing thickness ratio of at least 20% of chordal length is preferred to permit the wing ducts 95 to be of adequate flow area reducing internal drag. The action of the boundary layer slots 6 in conjunction with the relatively thick wings permits a high wing loading to be employed with relatively low external drag resulting.

In the foregoing description propulsive means for vertical rising aircraft have been set forth in which the essential elements for effective operation of an enclosed or protected propulsive system permit the cabin to remain in horizontal position. The present invention may assume many different forms, and also novel combinations with the invention set forth in copending application Serial No. 120,918. Therefore, the foregoing description and figures are schematically illustrative of general principles embraced by the subject invention, in a manner limited only by a just interpretation of the following claims.

I claim:

1. In an aircraft a propulsion system comprising, an air compressor having impeller vanes secured to a rotor, a power source for driving said compressor, a first duct and a second duct communicating with the discharge of said compressor, said first duct discharging propulsive air in a generally horizontal direction, said second duct discharging propulsive air in a generally downward direction, a valve exposed to said compressor's discharge air flow to proportion the relative amount of air flow through said first duct with respect to said second duct, and said rotor having an axis obliquely inclined with respect to the horizontal and vertical directions of flight of said aircraft to minimize the turning angles of said air flow from the compressor to said ducts.

2. In an aircraft having wings and an empennage, a propulsion system comprising at least two air compressors, one of said compressors being located in each wing adjacent to the outboard end thereof, at least one turbo-jet power plant in the empennage for driving said compressors and having a rearwardly directed propulsive nozzle, and discharge outlets for propulsive air from said compressors adjacent to said outboard ends of said wings.

3. In an aircraft having wings mounted on a fuselage, a propulsion system comprising at least two air compressors, one of said compressors being located in each wing, at least one power source at the aft end of the fuselage for driving said compressors and including a rearwardly directed propulsive nozzle, a first air outlet and a second air outlet communicating with the discharge of each of said compressors, said first outlet discharging air beneath said wings, and said second outlet discharging air through said nozzle.

4. In an aircraft having upswept wings secured to a fuselage and tip shields at the free ends of said wings, a ducted air compressor housed in each of said tip shields, a power source for driving said compressors, a plurality of air turning vanes on the outboard surface of said shields communicating with said compressors' inlets, the discharge of each of said compressors communicating with the interior of said wing, a rearwardly directed propulsive nozzle communicating with the interior of each of said wings, a hinged door in the lower surface of each of said wings adapted to open into said wings to vent air downward from the discharge of said compressors, and servo-means to regulate the degree of opening of said doors.

5. In an aircraft having a fuselage the combination of; hollow wings and a hollow empennage on the fuselage, air inlets in the tip regions of the wings communicating with the interiors of the wings, a propulsive nozzle communicating with the interior of said empennage, the interiors of said wings communicating with the interior of said empennage, compressors in the tip regions of the wings for impelling air from said inlets to said nozzle, and power means for driving said compressors located in said empennage.

6. An aircraft as defined in claim 5 and further characterized by said wings having a thickness of at least 20% of the chordal length of said wings and slots in the upper surfaces of said wings leading air from the interior of said wings to the atmosphere in a direction opposite to the flight direction of said aircraft.

7. An aircraft as defined in claim 5 and further characterized by a flexible joint securing said empennage to said fuselage.

8. An aircraft as defined in claim 5 and further characterized by a first flexible joint securing said empennage to said fuselage, said power means being secured to said empennage to be movable therewith, a power transmission system extending from said power means to said compressors, and a second flexible joint in said transmission system adjacent to said first flexible joint.

9. An aircraft as defined in claim 5, and further characterized by a bevel gear box, said power means being connected in driving relationship to said gearbox, and shafts extending from said gearbox to drive said compressors.

10. An aircraft propulsion system as defined in claim 4, each of said compressors being of the axial flow type having a rotor, and a rotative bearing for each rotor supported by some of said turning vanes.

11. In an aircraft having a fuselage and wings thereon; the combination of a ducted compressor in the tip of each wing, an air inlet for each compressor in the tip of its respective wing, an outlet for each compressor discharging air from the wing in the form of a propulsive jet, valve means for controlling each outlet, power plant means at the aft end of the fuselage discharging a projulsive jet therefrom, and shaft drives extending through the wings from the power plant means to the compressors to drive the latter.

12. In an aircraft having a fuselage and wings therein; the combination of a ducted compressor in the tip of each wing, an air inlet for each compressor in the tip of its respective wing, power plant means at the aft end of the fuselage having a nozzle for discharging a propulsive jet rearwardly therefrom, drives extending from the power plant means to the compressors to drive the latter, ducts leading from the compressors to the nozzle to conduct compressed air from the compressors to the nozzle for discharge therefrom, and means adjacent the tips of the wings for diverting air from the ducts and directing the same downwardly from the wings in the form of propulsive streams.

13. In an aircraft having a fuselage and wings; the combination of a ducted axial flow compressor in the outboard end region of each wing, air inlet means for each compressor in the tip of its respective wing, power plant means at the aft end of the fuselage, drive means extending from the power plant means to the compressors to drive the latter, and means for directing the compressed air from the compressors in either the rearward or downward directions in the form of propulsive streams.

14. In an aircraft having a fuselage the combination of; wings extending from the fuselage and having discharge openings for the discharge of air, tip shields at the outboard ends of the wings having openings for the reception of air, ducted air compressors housed in the tip shields receiving air from said openings of the tip shields and discharging it through said openings in the wings for propulsion of the aircraft, closure means for controlling said discharge openings in the wings, a power source in the fuselage, and a drive shaft extending from said power source to each compressor.

15. In a vertical rising aircraft the combination of; an up-swept wing having an air inlet in the tip thereof and an air duct extending spanwise therethrough at an acute angle to the normal direction of flight of the aircraft, an empennage having an air outlet means communicating with said duct to receive air therefrom and operable to discharge the air in the aft direction relative to the normal direction of flight, a ducted compressor in the tip region of the wing receiving air from said inlet and moving it through said duct for discharge from said outlet means for propulsion of the aircraft, and a power source for driving the compressor.

16. In a vertical rising aircraft the combination of an up-swept wing, having an air inlet in the tip thereof and having an air passage extending spanwise in the wing, said passage having an outlet directed downwardly from the wing and a second outlet directed rearwardly from the upper surface of the wing, air turning means at said inlet directing the incoming air through an arc not greater than 60° in respect to the direction of level flight of the aircraft, a ducted compressor in the tip region of the wing for moving air from said inlet and through said passage for discharge from said outlets, a power source for driving said compressor, and closure means for controlling said downwardly directed outlet.

17. In an aircraft having a body and a wing extending therefrom the combination of; duct means extending spanwise in the wing, air inlet means in the tip region of the wing for admitting air to the duct means, air outlet means associated with the body having communication with the duct means to discharge air therefrom and movable to vary the direction of the propulsive thrust obtained by the discharge of the air therefrom, a second air outlet means in the wing for discharging air from the duct means, closure means for the second outlet means movable to vary the amount of air discharged therethrough, and compressor means for moving air through the duct means from said inlet means to said two outlet means.

NATHAN C. PRICE.

REFERENCES CITED

The following references are of record in the file of this patent:

UNITED STATES PATENTS

| Number | Name | Date |
|---|---|---|
| 1,476,730 | Seale | Dec. 11, 1923 |
| 1,585,281 | Craddock | May 18, 1926 |
| 1,892,460 | Gayman | Dec. 27, 1932 |
| 2,447,100 | Stalker | Aug. 17, 1948 |
| 2,451,008 | Williams | Oct. 12, 1948 |
| 2,470,348 | Haight | May 17, 1949 |
| 2,523,938 | Berliner | Sept. 26, 1950 |

FOREIGN PATENTS

| Number | Country | Date |
|---|---|---|
| 573,656 | France | Mar. 14, 1924 |
| 518,663 | Great Britain | Mar. 5, 1940 |